United States Patent [19]

Wright

[11] 4,288,981
[45] Sep. 15, 1981

[54] TURBINE-TYPE ENGINE

[76] Inventor: Elwood H. Wright, 7320 6th Ave., Tacoma, Wash. 98406

[21] Appl. No.: 916,096

[22] Filed: Jun. 16, 1978

[51] Int. Cl.³ .............................................. F02C 5/00
[52] U.S. Cl. .................................. 60/39.38; 60/39.64; 60/39.75; 60/39.76; 60/729
[58] Field of Search ................. 60/39.64, 39.75, 39.55, 60/39.45, 39.16, 729, 39.76, 39.38

[56] References Cited

U.S. PATENT DOCUMENTS

| | | | |
|---|---|---|---|
| 898,753 | 9/1908 | Lees et al. ........................ | 60/729 X |
| 1,149,252 | 8/1915 | Dianovszky ....................... | 60/39.75 |
| 1,291,273 | 1/1919 | Tyler ............................... | 60/39.75 X |
| 1,296,368 | 3/1919 | Cooper .......................... | 60/39.64 X |
| 1,299,330 | 4/1919 | Groves ............................. | 60/39.64 |
| 2,370,217 | 2/1945 | Wright ............................. | 60/39.38 |
| 2,523,012 | 9/1950 | Goddard ........................... | 60/39.64 |

Primary Examiner—Carlton R. Croyle
Assistant Examiner—Edward Look
Attorney, Agent, or Firm—Howard I. Podell

[57] ABSTRACT

A turbine-type engine which has a blade-type rotor mounted in a housing on a drive shaft, a plurality of cylinders symmetrically spaced about the drive shaft radially thereof, each having a piston connected by rods to a crank throw of the drive shaft, each cylinder having a combustion chamber with fuel injecting and water injecting means for injecting a fine spray of water in the chamber on the alternate cooling stroke of the corresponding compressor after detonation of the fuel to generate usuable steam pressure producing power incident to the dissipation of the internal heat of the engine.

1 Claim, 7 Drawing Figures

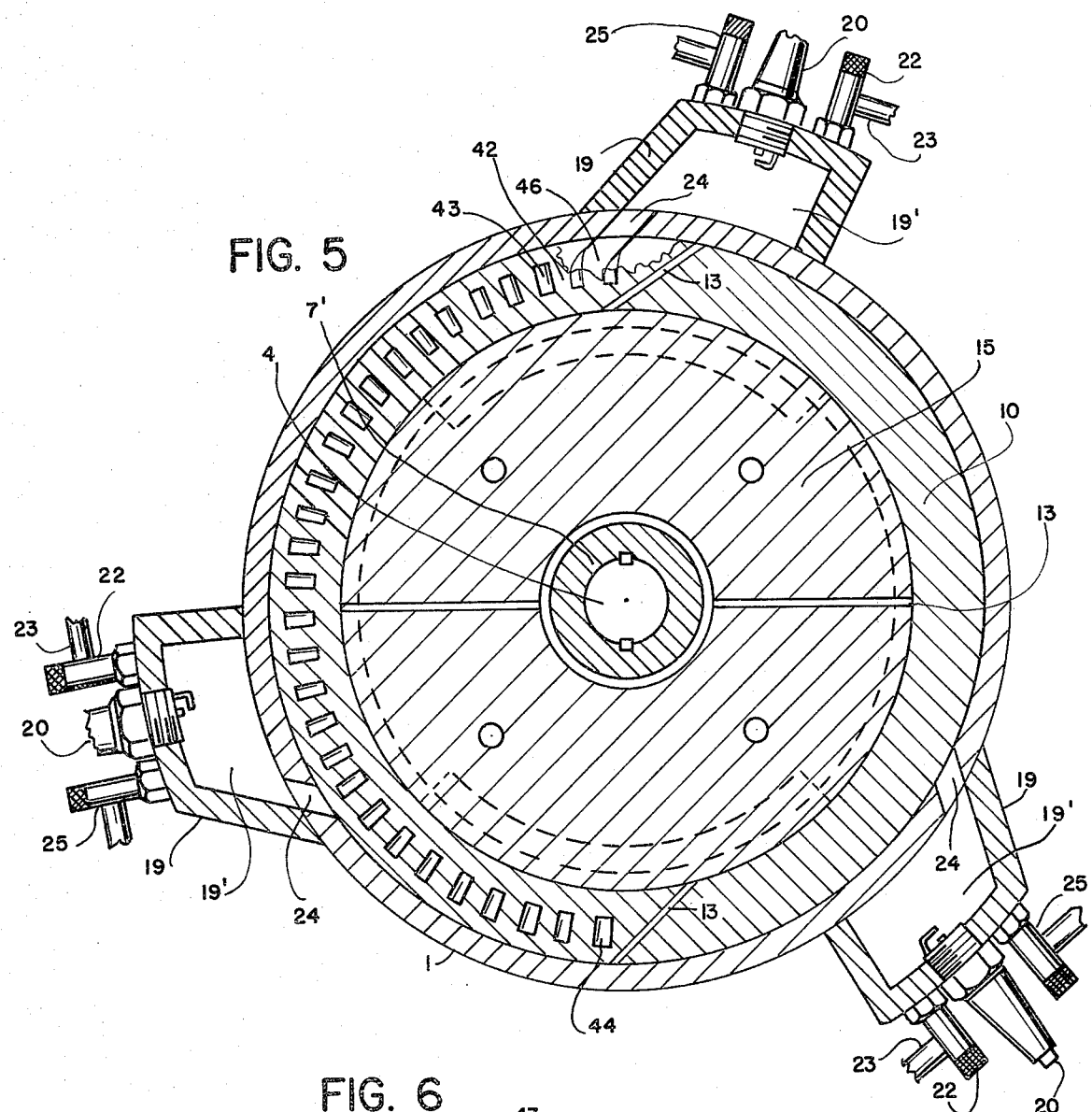
FIG. 5
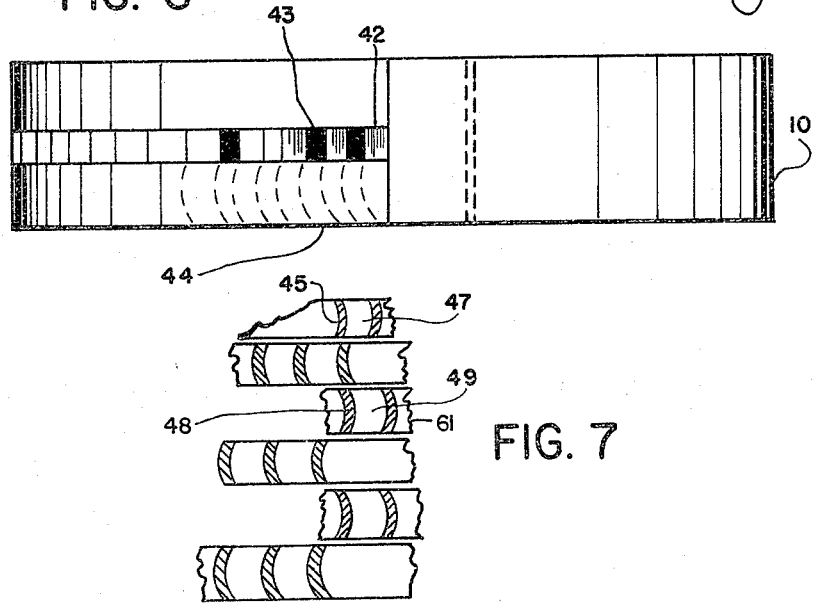
FIG. 6
FIG. 7

TURBINE-TYPE ENGINE

FIELD OF THE INVENTION

This invention relates generally to an improved turbine-type engine and is an improvement over my earlier U.S. Pat. No. 2,370,217.

DESCRIPTION OF THE PRIOR ART

The prior art, as exemplified by U.S. Pat. Nos. 2,370,217; 2,320,391; 1,388,371; 1,074,635; 2,611,240; 1,867,917; 3,088,276 and 2,608,058 is generally illustrative of the pertinent art but the aforementioned patents are non-applicable to the present invention. While the prior art expedients are generally acceptable for their intended purposes only, the have not proven entirely satisfactory in that they are either complex and expensive to manufacture, or bulky and inconvenient to use, or to operate. As a result of the shortcomings of the prior art, typified by the above, there has developed a substantial need for improvement in this field.

OBJECT OF THE INVENTION

This invention has for its principal object to provide an improved turbine-type engine, equipped with a plurality of combustion chambers circumferentially thereof and within which fuel charges may be compressed and ignited in predetermined order and in synchronism with movement of a rotor, the force of the ignited charge being directed against the impeller vanes of a rotor of novel form in such a manner as to utilize the kinetic energy of the combusted fuel to the greatest extent for the driving of the rotor.

It is also an object of this invention to provide a rotor that acts as a valve for closing the ports of the combustion chambers during the periods that the fuel charges are being compressed therein, and wherein there is a succession of impeller vanes against which the ignited charges are progressively applied while the energy therein is being dissipated. This valve-type rotor will herein be referred to as the control rotor.

It is a further object of this invention to provide a blade-type rotor coaxially mounted on the main shaft, said rotor will revolve at a higher speed, presenting a greater surface area for more complete dissipation of the energy. The optimum relative speed of the control rotor and the blade-type rotor is to be determined by actual test.

It is a further object of this invention to provide an engine of the above character wherein provision is made for automatic self-sealing of the joints between the combustion chamber, and other relatively stationary parts, and the walls of the driven rotor to insure against any leakage or loss of efficiency resulting therefrom, yet without causing any undue drag on the rotor.

It is a further object of this invention to provide an engine of the above character wherein provision is made for two sets of injectors for each combustion chamber. One set of injectors injects combustible fuel during a compression period, after the detonation of the charge and on the alternate compression period that other set of injectors will inject water, using the heat of the combustion chamber in a manner similar to a flash boiler, and in so doing dissipate the detrimental heat in the form of a high pressure steam against the impeller vanes of both rotors, thereby utilizing more of the B.T.U.'s within the fuel as usable power delivered to the shaft.

Still further objects of this invention reside in the details of construction of parts comprised in the engine, in their combination, and in their mode of operation, as will hereinafter be fully described.

BRIEF DESCRIPTION OF THE DRAWING

In accomplishing these and other objectives of the invention, I have provided the improved details of construction, the preferred forms of which are illustrated in the accompanying drawings wherein:

FIG. 5 is a cross-section of the engine;

FIG. 6 is an edge view of the control rotor showing the impeller vanes and the direction of the force of the blade-type rotor;

FIG. 7 is a sectional view of the blade-type rotor and fixed vanes;

DESCRIPTION OF THE PREFERRED EMBODIMENTS

Figure 1:
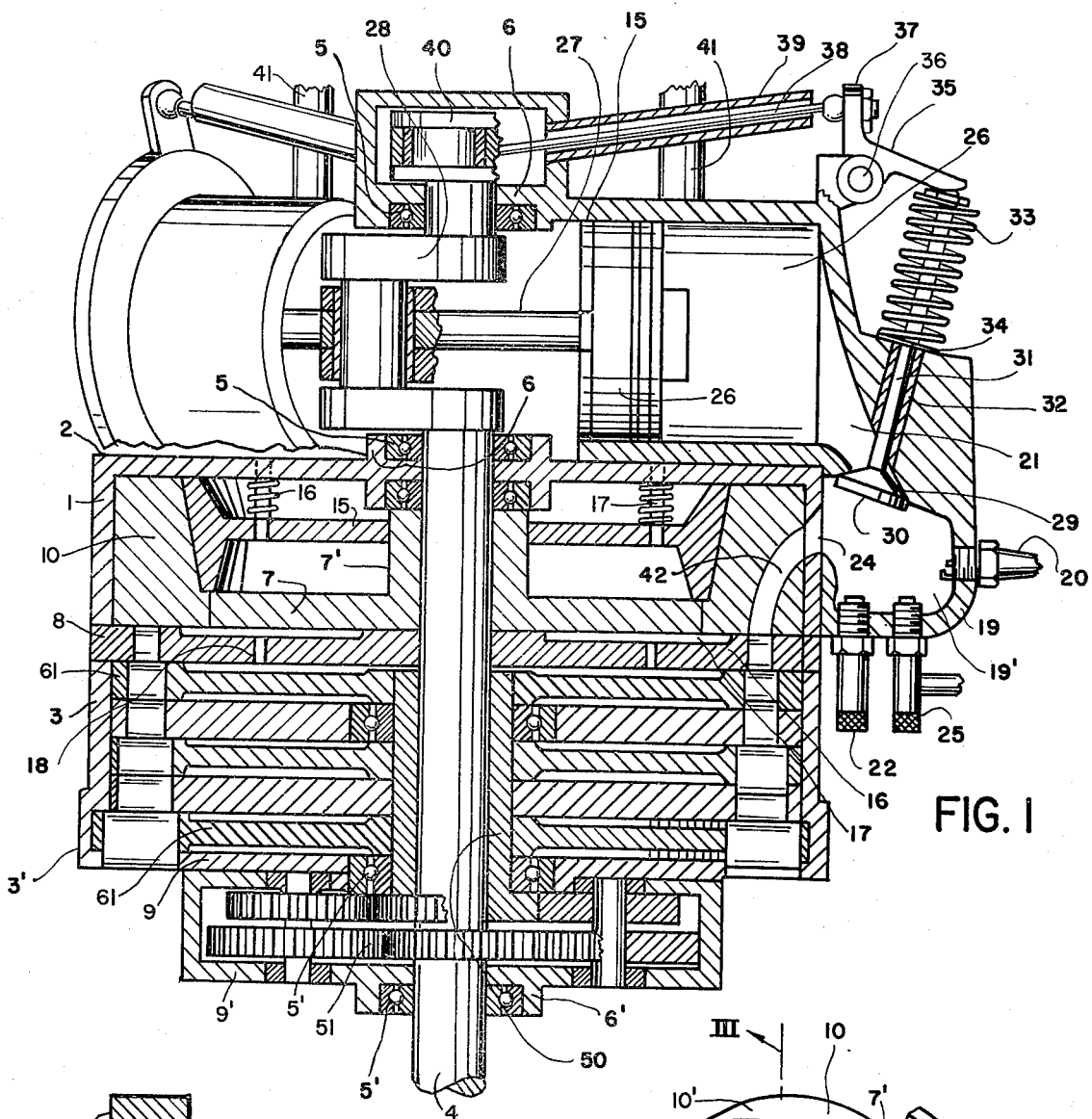
FIG. 1 is a sectional view of the engine, wherein the fuel supply means, manifolds and compressors are illustrated.
Figure 2:
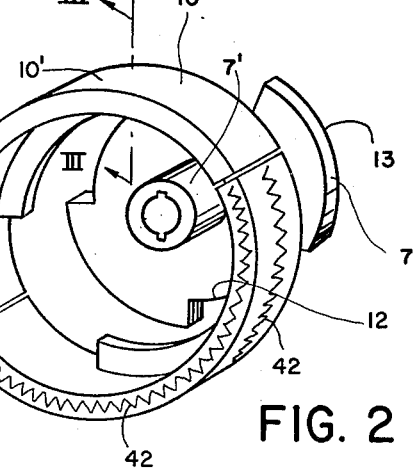
FIG. 2 is a detail exploded perspective view.

Referring in more detail to FIG. 2, the engine embodied in this invention comprises a cylindrical enclosed housing 1 closed at one end by a flat wall 2, here indicated as being integral with cylindrical body, and closed at its other end by a removable applied wall 3, which may be held by bolts or other suitable means. Coaxially of the cylindrical housing, and extending through end walls 2-8 is the engine shaft 4. This shaft is functionally and rotatably supported at opposite ends of the engine in antifriction bearings designated at 5 and 5', and which could be of any suitable kind other than shown. These bearings as shown are fitted in housings 6 and 6' formed on the faces of the wall plates 2-9 and 9' about the openings through which the shaft 4 passes. Keyed on the shaft within the housing 1, is the control rotor assembly, comprising a disk-like body 7, equipped with an integral hub 7', that receives the shaft and within which the shaft is keyed. This disk engages flatly against the wall plate 2 and about the peripheral portion of the disk is an annular body, 10, (FIG. 3) in the nature of a cylindrical ring. This ring is of substantial thickness, radially of the engine, and has a width corresponding to the space between the end walls 2 and 8 of the housing to fit snugly between them. Also, the ring has diametrically opposed and inwardly directed flanges 11-11' at one end adapted to register within correspondingly shaped sockets or recesses 12-12' at the periphery of the disk 7 to provide interlocked driving connection that causes parts 10 and 7 to rotate together. The outer surface of the control ring is fitted to the interior of the housing 1 in a gas-tight joint and, to prevent the possible binding of these two surfaces that might be due to the effect of high temperatures in the engine, the ring 10 is divided into two or more segments, separated at the loose joints as indicated at 13 in FIG. 5. The exterior surface of the ring 10 is truly cylindrical and, having a conically tapered interior surface, fitted to its interior surface is a non-rotating ring-like member, 15, with a conically tapered exterior and a radially extending flange. This member 15 is likewise divided into a plurality of segments as designated by joints 14 in FIG. 2, and is held against rotation in the housing by means of studs 17 extending thereon and passing outwardly through holes 18 in the housing end wall 3 and noted in FIG. 2. Surrounding studs 17 and between member 15 and end wall 2, as shown in FIG. 1, are coil springs 16. The function of these springs is to yieldingly push the ring 15 against ring 10, thus causing the exertion of spreading pressure against the inside surface of the segments of the divided ring-like member 10 to cause it to retain itself tightly against the outer casing. The segmental construction of these parts permits expansion and contraction without detriment and insures tightness of joints under all conditions.

Mounted on the casing 1, at regularly spaced intervals, herein shown to be intervals of 120°, are explosion chambers, 19, each like the other in its construction and use. Each chamber is equipped with a spark plug and an air inlet port, 21. Fuel mixture is supplied to the various chambers, 19, by injectors, 22. These injectors supplied with fuel through pipes, 23, leading thereto, are similar in construction and operation to the conventional fuel injectors used in present day Diesel engine operation, and are operated in synchronism with the injection of air charges into the chambers, under the influence of any standard liquid injection pump (not shown).

Figure 3:
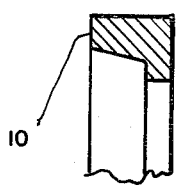
FIG. 3 is a detail cross sectional view taken on line III—III of FIG. 2.

In predetermined order in synchronism with control rotor 10, just prior to the opening of passage 24, the fuel mixture is ignited by spark plug 20. Also mounted on each of the cylinder heads 19, and opening into the combustion chamber 19' thereof, as best shown in FIG. 3, are water injectors designated generally by reference numeral 25. These are similar in construction to the fuel injectors previously described, each injecting a measured quantity of water as a fine spray into the chamber just prior to the uncovering of passage 24, on the alternate cooling stroke of the corresponding compressor. The purpose of the water injectors is to provide for the generation of a usable steam pressure that will produce power incident to the dissipation of the internal heat of the engine. The water thus serves as a cooling means as well as a power producing means. The driving of the pumps and its synchronization with the travel rotor, would be through any suitable type of driving connection between the pump and the rotor shaft.

The cylinders are arranged in symmetrical spacing about the drive shaft, radially thereof, and having open inner ends, and each is equipped with a piston, 26. The several pistons are operatively connected by rods 27 with a crank throw 28 of the drive shaft 4 adjacent the outside wall 2. Each compressor cylinder has an outlet passage 21 leading from its outer end to the valved port 29 of the corresponding combustion chamber 19' and each port 29 is equipped with a poppet valve 30 as best noted in FIG. 1. The valve head 30 in each chamber is mounted on a valve rod 31 that is slidable in a bushing 32 and extends to the side of the engine beyond the cylinders. Coiled springs 33 surround the outer end portion of the rods and bear against seats to yieldingly hold the valves closed. Each valve is designed to be opened by a rocker lever 35 which is pivoted on the wall of the corresponding cylinder as at 36 and has at its outer end an adjustable tappet seat 37 operated by push rods 38 mounted in slidable bushing 39 and has its inner end connected to a crank arm 40, being an extension of the main shaft and synchronizing the valve operation with the ignition of the fuel charges in the combustion chambers.

The inlet ports 41 are spaced substantially from the outer end walls and when a piston is actuated inwardly it creates a partial vacuum in the cylinder. When the piston moves beyond the cylinder inlet port, an air charge is quickly drawn into the cylinder. On its outward travel, the piston drives the air charge under compression past the open poppet valve into the combustion chamber, and in proper timing the charge is ignited. The ignition system is not shown but could be of the usual kind.

One of the important features of this invention resides in the novel and effective way in which the force of the ignited fuel charge and high pressure steam is utilized for driving the control rotor and blade rotor. This is accomplished by and through the following means.

Figure 4:
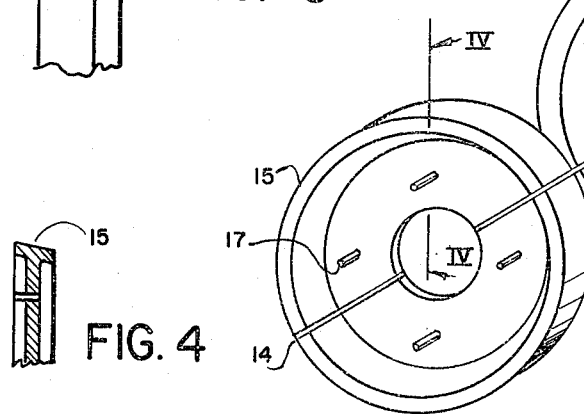
FIG. 4 is a detail cross sectional view taken on line IV—IV of FIG. 2.

Opening from each combustion chamber 19' in a direction tangentially inclined with respect to the control rotor 10, is a direct passage 24 through which the combusting gases of any ignited fuel charge and high pressure steam escape from the combustion chamber to the control rotor ring 10, in position for registering alignment with one of the several passages 24. A band of impeller vanes 42 spaced apart by passages 43 which open directly through the side of the control rotor 10 at 44. Offset from the semi-circular band of passages in the coaxial direction of the rotor are stationary vanes and passages extending about the casing to its full circumference. It being understood that in each of the bands, vanes are equally spaced apart. Each vane in the control rotor has an accurately concaved inner face 46 so directed or faced that in rotation of the control rotor 10, this face will be directly impinged by the force of gas or steam delivered from the chamber 19' through the passage 24. The opposite face of each vane 44 is quite convex extending through the side of the control rotor 10, being coaxial and radial to the shaft 4. The passages 42 are alike in size and shape and direction relative to the axis of the ring, and each passage, due to the shape of the faces of the vanes forms a sort of reverse bend as will be readily understood by inspection of FIG. 3 and FIG. 4. Formed in the casing 3 at regular intervals are stationary vanes 45 and passages 47 convex in shape and opposed to vanes 42 and passages 43 in the control rotor 10 and to vanes 48 and passages 49 of a blade-type rotor 61, the purpose being to reverse the force and impinge it upon the vanes 48 of the blade-type rotor. As the force is directed through the stages of the blade-type rotor, the area of the vanes in the blade-type rotor is progressively increased in each stage. The number of stages through which the force is directed may be more or less than herein shown. Thus it will be understood the control rotor 10, due to the unported portion 10' extending through 180°, will operate as a valve to close off the outlet 24 from each explosion chamber 19' during a certain period for the compression of the fuel charge in the chamber.

The blade-type rotor is mounted on a hollow shaft 50 through which passes the main shaft 4 being connected by a gear assembly 51. The blade-type rotor is enclosed in casing 3' which may be secured to the end plate 8 of the control rotor casing 3 by any suitable means.

With parts and passages so formed, it will be understood that an expanding, combusting fuel charge, after ignition in any explosion chamber, or the force of high pressure steam generated by the residue heat of explosion chamber 19', will be directed through the outlet passages 24 against vanes 42 of the semi-circular band of passages, to impart rotary motion to the rotor. This expanding charge will continue, passing through the passage 47 between the vanes into corresponding return bend passages to impart rotary motion to both rotors. Engines of this kind may be made in various sizes according to requirements, and as previously stated the blade-type rotor may be equipped with three or more stages of impeller vanes, as desired to suit a particular purpose.

In conclusion, I have set forth in the engine herein described not a true turbine, nor have I described a true reciprocal engine, I have however set forth an engine with the mechanical parts so arranged that more complete use of the fuel cna be delivered to the shaft than in any other type engine.

In a four cycle reciprocal engine, if water is injected during the power stroke or during actual combustion, it results in metallurgical breakdown. This was experience in World War II aircraft engines. If the injection was made during the exhaust stroke, a possible cooling may be the result, however no usable power would be developed.

The torque value of the power delivered in a reciprocal engine is limited by the length of the throw of the crank. In this engine the force is applied at the periphery of the rotor, giving this engine a distinct advantage in torque value.

Many steam engines have been developed that have an extremely high efficiency after the steam has been generated, however most of the B.T.U.'s were lost in the process of generating the steam.

The engine herein set forth is new and novel in the manner in which it is arranged using known facts in a different arrangement, making this engine an entirely new and different type.

The engine set forth will allow for the more complete use of the expanding gasses and, further, allow the use of the residue heat to generate a high pressure steam as a usable force, while acting as a cooling agent to dissipate the detrimental internal heat of the engine. The force will be applied at the periphery of the rotor, giving the maximum torque to the shaft for the power expended.

The operation and use of the invention hereinabove described will be evident to those skilled in the art to which it relates from a consideration of the foregoing.

The present invention is believed to accomplish among others all of the objects and advantages herein set forth.

Without further analyses, the foregoing will so fully reveal the gist of this invention that those skilled in the art can by applying current knowledge thereto readily adapt it for various applications without omitting certain features which can constitute essential characteristics of the generic or specific aspects of this invention. Therefore, a more lengthy description is deemed unnecessary.

It is intended that various changes may be made in this invention in the practical development thereof, if desired. Such changes are comprehended within the meaning and range of equivalency of the following claims. The invention, therefore, is not to be restricted except as is necessitated by the prior art.

Having thus described the invention, what is claimed as new and to be secured by Letters Patent is:

1. A turbine-type engine comprising, in combination, a casing, a rotor shaft revolubly mounted in a casing, a plurality of combustion chambers mounted about the casing, a control rotor fixed against relative rotation of the shaft and having a cylindrical flange fitted revolubly in the casing and formed with a series of laterally spaced circumferentially directed bands of impeller vanes and with passages through the flange between the vanes; the first of the series of bands of impellers being extended only partially about the cylinder, a blade-type rotor mounted on a sleeve that is rotatably mounted about the said shaft, and located so that the passages through the control rotor extend to passages between vanes of the blade-type rotor, so that pressurized gases from the combustion chambers are directed to the vanes of the blade-type rotor so as to rotate said rotor, said combustion chambers mounted in the casing about the control rotor, means for independently admitting fuel charges and compressed air to the chambers, means in each chamber for igniting the charges, delivery passages from the chambers directed tangentially against the control rotor in the plane of the partial band of impellers and passages; and water injecting means for injecting a fine spray of water in each of said combustion chambers independently of the injection of fuel charges in the corresponding combustion chamber so that water spray may be injected in each combustion chamber after detonation of the fuel therein, so as to generate in the combustion chamber, while cooling said chamber, usable steam pressure producing power incident to the dissipation of the internal heat of said engine against said impeller vanes and against the vanes of the blade-type rotor, in which the blade-type rotor is fixed to the sleeve and the sleeve is rotatably linked by gears to the shaft.

* * * * *